(12) United States Patent
Reisacher et al.

(10) Patent No.: US 8,716,390 B2
(45) Date of Patent: May 6, 2014

(54) PIGMENT PREPARATIONS COMPRISING NONIONIC SURFACE-ACTIVE ADDITIVES

(75) Inventors: Hans Ulrich Reisacher, Maxdorf (DE); Uwe Mauthe, Mannheim (DE)

(73) Assignee: BASF SE, Ludwigshafen (DE)

( * ) Notice: Subject to any disclaimer, the term of this patent is extended or adjusted under 35 U.S.C. 154(b) by 29 days.

(21) Appl. No.: 13/129,820

(22) PCT Filed: Nov. 17, 2009

(86) PCT No.: PCT/EP2009/065262
§ 371 (c)(1),
(2), (4) Date: May 18, 2011

(87) PCT Pub. No.: WO2010/057864
PCT Pub. Date: May 27, 2010

(65) Prior Publication Data
US 2011/0224354 A1    Sep. 15, 2011

(30) Foreign Application Priority Data
Nov. 18, 2008 (EP) ..................................... 08169324

(51) Int. Cl.
*C09B 67/20* (2006.01)
*C08J 3/20* (2006.01)
*C08K 5/00* (2006.01)
*C09B 67/00* (2006.01)

(52) U.S. Cl.
USPC ............................. 524/502; 525/89; 106/499

(58) Field of Classification Search
USPC ....................... 524/500, 502; 525/89; 106/499
See application file for complete search history.

(56) References Cited

U.S. PATENT DOCUMENTS

| 5,855,662 | A | 1/1999 | Brand et al. | |
|---|---|---|---|---|
| 7,198,667 | B2 * | 4/2007 | Klopp et al. | 106/493 |
| 7,198,668 | B2 * | 4/2007 | Reisacher et al. | 106/499 |
| 2005/0080171 | A1 | 4/2005 | Reisacher et al. | |
| 2005/0090609 | A1 | 4/2005 | Reisacher et al. | |
| 2006/0112852 | A1 * | 6/2006 | Klopp et al. | 106/31.78 |
| 2010/0021701 | A1 | 1/2010 | Heinrichs | |

FOREIGN PATENT DOCUMENTS

| DE | 10 2006 034 240 | 1/2008 |
|---|---|---|
| EP | 0 735 109 | 10/1996 |
| WO | 00 47681 | 8/2000 |
| WO | 03 064540 | 8/2003 |
| WO | 03 066743 | 8/2003 |
| WO | 04 000903 | 12/2003 |
| WO | 2004 029159 | 4/2004 |
| WO | 2004 046251 | 6/2004 |
| WO | 2004 050770 | 6/2004 |
| WO | 2006 084849 | 8/2006 |
| WO | 2006 084861 | 8/2006 |

OTHER PUBLICATIONS

International Search Report Issued Aug. 5, 2010 in PCT/EP09/065262 filed Nov. 17, 2009.

* cited by examiner

*Primary Examiner* — John Uselding
(74) *Attorney, Agent, or Firm* — Oblon, Spivak, McClelland, Maier & Neustadt, L.L.P.

(57) ABSTRACT

The present invention relates to a solid pigment preparation comprising, each percentage being based on the total weight of the preparation, (A) at least 60% by weight of a pigment component comprising one or more pigments and optionally a filler; (B) 1% by weight to 39% by weight of at least one nonionic water-soluble surface-active additive based on polyethers having an HLB value of greater than 10, (C) 1% by weight to 39% by weight of at least one nonionic surface-active additive based on polyethers having an HLB value of less than 10; (D) 0% by weight to 10% by weight of an additive component comprising at least one further additive, the sum total of the weight fractions not exceeding 100% by weight. The present invention further relates to processes for production thereof and to processes for coloring macromolecular materials.

12 Claims, No Drawings

PIGMENT PREPARATIONS COMPRISING NONIONIC SURFACE-ACTIVE ADDITIVES

The present invention relates to pigment preparations, to the production of these pigment preparations and to their use for coloring macromolecular organic and inorganic materials.

Liquid systems such as coatings, varnishes, emulsion paints and printing inks are customarily pigmented using pigment formulations comprising water, organic solvent or mixtures thereof. In addition to anionic, cationic, nonionic or amphoteric dispersants, these pigment formulations generally have to be additized with further auxiliaries, such as dried-crust inhibitors, freeze resistance enhancers, thickeners and anti-skinners, for stabilization.

There is a need for novel pigment preparations that are comparable to liquid formulations with regard to color properties and dispersibility, but require less if any of the additization mentioned and/or are easier to handle. However, simply drying liquid formulations does not yield solid pigment preparations that have comparable performance characteristics.

WO-A 03/64540, WO-A 03/66743, WO-A 04/00903, WO-A 04/29159, WO-A 04/46251, WO-A 04/50770 and also WO-A 06/084849, WO-A 06/084861 and WO-A 00/47681 all describe pigment preparations comprising nonionic surface-active additives based on polyethers and/or anionic water-soluble surface-active additives based on acidic esters of these polyethers, on polymers of ethylenically unsaturated carboxylic acids and/or on polyurethanes and also fillers, and being notable for this stir-in behavior.

Prior art pigment preparations do have adequate stir-in characteristics for aqueous systems, but are not universally useful in all aqueous systems. It is specifically in aqueous vinyl acetate dispersions that these products exhibit infirmities. Nor are these products very suitable for use in solvent-containing systems.

It is an object of the present invention to provide solid pigment preparations having altogether advantageous application characteristics, in particular high color strength and particularly easy dispersibility (stir-in behavior) in a wide variety of application media and particularly the abovementioned properties.

We have found that this object is achieved by a solid pigment preparation comprising, each percentage being based on the total weight of the preparation,
(A) at least 60% by weight of a pigment component comprising one or more of a pigment and/or a filler,
(B) 1% by weight to 39% by weight of at least one nonionic water-soluble surface-active additive based on polyethers selected from the group consisting of ethylene oxide homopolymers; ethylene oxide-propylene oxide block copolymers where the terminal blocks consist of ethylene oxide units; ethylene oxide adducts on mono- or bifunctional amines or alcohols where the length of the ethylene oxide chain is chosen such that the adduct is water-soluble; and ethylene oxide-propylene oxide block copolymer adducts on mono- or bifunctional amines or alcohols where the terminal block consists of ethylene oxide units;
(C) 1% by weight to 39% by weight of at least one nonionic surface-active additive based on polyethers selected from the group consisting of propylene oxide homopolymers; ethylene oxide-propylene oxide block copolymers where the terminal blocks consist of propylene oxide units; ethylene oxide adducts on mono- or bifunctional amines or alcohols where the length of the ethylene oxide chain is chosen such that the adduct is water-insoluble; and ethylene oxide-propylene oxide block copolymer adducts on mono- or bifunctional amines or alcohols where the terminal block consists of propylene oxide units;
(D) 0% by weight to 10% by weight of an additive component comprising at least one further additive other than additives of components (A) and (B),
the sum total of the weight fractions not exceeding 100% by weight.

The present invention also provides a process for producing a preparation of the present invention, which comprises wet-comminuting the component (A) in an aqueous suspension comprising some or all of the additive (B) and optionally (D) either in the presence of the additive (C) or subsequently adding the additive (C) and optionally (D) and then drying the suspension, if appropriate after addition of the remaining amount of additive (B) and optionally (D).

The present invention further provides a process for coloring macromolecular organic and inorganic materials, which comprises incorporating the preparation according to the present invention into these materials by stirring or shaking. The materials may comprise particularly materials which are varnishes, paints, printing inks, liquid inks or coating systems comprising water, organic solvents or mixtures of water and organic solvents as liquid phase.

The present invention further provides a process for coloring macromolecular organic and inorganic materials using color-mixing systems, which comprises using a preparation of the present invention as mixing components.

The pigment preparations of the present invention comprise the pigment component (A), the nonionic water-soluble surface-active additive (B) and the nonionic surface-active additive (C) as essential constituents, with the components (B) and (C) each being based on polyethers. In addition, further additives other than those of components (B) and (C) can be present to form the component (D). It will be appreciated that all the constituents sum to 100% by weight of the preparation.

Preferably, the sum total of the weight fractions of components (B) and (C) based on the total weight of the preparation is in the range from 10% by weight to 30% by weight and more preferably in the range from 15% by weight to 30% by weight.

Component (A) in the pigment preparations of the present invention may comprise organic or inorganic pigments. It will be appreciated that the pigment preparations may also comprise mixtures of various organic or various inorganic pigments or mixtures of organic and inorganic pigments. The same logic applies to fillers and mixtures of pigment(s) and filler(s).

Preferably, the component (A) comprises at least one pigment and optionally at least one pigment synergist. It is similarly preferable for the component (A) to comprise at least one filler.

The pigments are typically present in finely divided form. The pigments accordingly typically have average particle sizes in the range from 0.1 to 5 μm.

Organic pigments typically comprise organic color and black pigments. Inorganic pigments may likewise comprise color pigments (chromatic, black and white pigments) and also luster pigments and the inorganic pigments typically used as fillers.

There now follow examples of suitable organic color pigments:
  monoazo pigments: C.I. Pigment Brown 25;
   C.I. Pigment Orange 5, 13, 36, 38, 64 and 67;
   C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251;
C.I. Pigment Yellow 1, 3, 62, 65, 73, 74, 97, 120, 151, 154, 168, 181, 183 and 191;
C.I. Pigment Violet 32;
disazo pigments: C.I. Pigment Orange 16, 34, 44 and 72;
C.I. Pigment Yellow 12, 13, 14, 16, 17, 81, 83, 106, 113, 126, 127, 155, 170, 174, 176, 180 and 188;
disazo condensation
pigments: C.I. Pigment Yellow 93, 95 and 128;
C.I. Pigment Red 144, 166, 214, 220, 221, 242 and 262;
C.I. Pigment Brown 23 and 41;
anthanthrone pigments: C.I. Pigment Red 168;
anthraquinone pigments: C.I. Pigment Yellow 147, 177 and 199;
C.I. Pigment Violet 31;
anthrapyrimidine
pigments: C.I. Pigment Yellow 108;
quinacridone pigments: C.I. Pigment Orange 48 and 49;
C.I. Pigment Red 122, 202, 206 and 209;
C.I. Pigment Violet 19;
quinophthalone pigments: C.I. Pigment Yellow 138;
diketopyrrolopyrrole
pigments: C.I. Pigment Orange 71, 73 and 81;
C.I. Pigment Red 254, 255, 264, 270 and 272;
dioxazine pigments: C.I. Pigment Violet 23 and 37;
C.I. Pigment Blue 80;
flavanthrone pigments: C.I. Pigment Yellow 24;
indanthrone pigments: C.I. Pigment Blue 60 and 64;
isoindoline pigments: C.I. Pigment Orange 61 and 69;
C.I. Pigment Red 260;
C.I. Pigment Yellow 139 and 185;
isoindolinone pigments: C.I. Pigment Yellow 109, 110 and 173;
isoviolanthrone pigments: C.I. Pigment Violet 31;
metal complex pigments: C.I. Pigment Red 257;
C.I. Pigment Yellow 117, 129, 150, 153 and 177;
C.I. Pigment Green 8;
perinone pigments: C.I. Pigment Orange 43;
C.I. Pigment Red 194;
perylene pigments: C.I. Pigment Black 31 and 32;
C.I. Pigment Red 123, 149, 178, 179, 190 and 224;
C.I. Pigment Violet 29;
phthalocyanine pigments: C.I. Pigment Blue 15, 15:1, 15:2, 15:3, 15:4, 15:6 and 16;
C.I. Pigment Green 7 and 36;
pyranthrone pigments: C.I. Pigment Orange 51;
C.I. Pigment Red 216;
pyrazoloquinazolone
pigments: C.I. Pigment Orange 67;
C.I. Pigment Red 251;
thioindigo pigments: C.I. Pigment Red 88 and 181;
C.I. Pigment Violet 38;
triarylcarbonium
pigments: C.I. Pigment Blue 1, 61 and 62;
C.I. Pigment Green 1;
C.I. Pigment Red 81, 81:1 and 169;
C.I. Pigment Violet 1, 2, 3 and 27;
C.I. Pigment Black 1 (aniline black);
C.I. Pigment Yellow 101 (aldazine yellow);
C.I. Pigment Brown 22.
Examples of suitable inorganic color pigments are:
white pigments: titanium dioxide (C.I. Pigment White 6), zinc white, pigment grade zinc oxide; zinc sulfide, lithopone;
black pigments: iron oxide black (C.I. Pigment Black 11), iron manganese black, black spinel (C.I. Pigment Black 27); carbon black (C.I. Pigment Black 7); chromium iron oxide black (P.Br. 29);
chromatic pigments: chromium oxide, chromium oxide hydrate green; chrome green (C.I. Pigment Green 48); cobalt green (C.I. Pigment Green 50); ultramarine green;
cobalt blue (C.I. Pigment Blue 28 and 36; C.I. Pigment Blue 72); ultramarine blue; manganese blue;
ultramarine violet; cobalt violet; and manganese violet;
iron oxide red (C.I. Pigment Red 101); cadmium sulfoselenide (C.I. Pigment Red 108); cerium sulfide (C.I. Pigment Red 265); molybdate red (C.I. Pigment Red 104); ultramarine red;
iron oxide brown (C.I. Pigment Brown 6 and 7), mixed brown, spinel and corundum phases (C.I. Pigment Brown 29, 31, 33, 34, 35, 37, 39 and 40), chromium titanium yellow (C.I. Pigment Brown 24), chrome orange;
cerium sulfide (C.I. Pigment Orange 75);
iron oxide yellow (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminum oxide, aluminum hydroxide, natural micas, natural and precipitated chalk and barium sulfate.

Luster pigments are platelet-shaped pigments having a monophasic or polyphasic construction whose color play is marked by the interplay of interference, reflection and absorption phenomena. Examples are aluminum platelets and aluminum, iron oxide and mica platelets bearing one or more coats, especially of metal oxides.

The pigment derivatives recited hereinbelow are particularly useful as pigment synergists which can combine with one or more pigments, in particular organic pigments, to form the pigment component (A).

In a preferred embodiment, the component (A) comprises at least one pigment synergist as well as at least one pigment. When present, the fraction of the total weight of the preparation of the present invention which is attributable to a pigment synergist is preferably in the range from 0.01% by weight to 5% by weight and more preferably in the range from 0.1% by weight to 3% by weight.

Pigment synergists preferably comprise pigment derivatives of formula I

where
P is the residue of the core structure of an organic pigment;
T1, T2 are each independently a chemical bond, —CONR1— or —SO2NR1—;
B1, B2 are each independently a chemical bond, C1-C8-alkylene or phenylene;

X, Y are each independently identical or different groups —SO3— Ka+ or —COO— Ka+;

m, n are each a rational number from 0 to 3 subject to the proviso that $1 \leq m+n \leq 4$;

Ka+ is H+, Li+, Na+, K+, N+R2R3R4R5 or a mixture thereof;

R1 is hydrogen; C1-C4-alkyl; phenyl or naphthyl which may each be C1-C18-alkyl substituted;

R2, R3, R4, R5 are each independently hydrogen; C1-C30-alkyl; C3-C30-alkenyl; C5-C6-cycloalkyl which may be C1-C24-alkyl substituted; phenyl or naphthyl which may each be C1-C24-alkyl or C2-C24-alkenyl substituted; a radical of the formula —[CHR6-CHR7-O]x-R8 where the repeat units —[CHR6-CHR7-O] can vary for x>1;

R6, R7, R8 are each independently hydrogen or C1-C6-alkyl;

X is an integer $\geq 1$.

The pigment derivatives I are based on an organic pigment's core structure P which is functionalized by sulfonic acid and/or carboxylic acid groups which are attached to the core structure either directly or via bridging elements. The term "core structure" as used herein shall comprehend the pigments themselves and also their precursors. Pigment precursors come into consideration in the case of polycyclic pigments in particular. They have the ring scaffold of the pigment, but the pigment's full substitution pattern is not present and/or functionalizations are missing. Perylene-3,4-dicarboximides may be mentioned as an example of a precursor to perylene pigments based on perylene-3,4,9,10-tetracarboxylic acids and their diimides.

In principle, the core structures of pigments selected from the group consisting of the anthraquinone, quinacridone, quinophthalone, diketopyrrolopyrrole, dioxazine, flavanthrone, indanthrone, isoindoline, isoindolinone, isoviolanthrone, perinone, perylene, phthalocyanine, pyranthrone, pyrazoloquinazolone and thioindigo pigments are preferred for the pigment derivatives I. Owing to their broad utility, pigment core structures selected from the group consisting of the quinophthalone, perylene and phthalocyanine pigments are particularly preferred. Among these, it is in turn the pigment core structures selected from the group consisting of the quinophthalone and phthalocyanine pigments which are very particularly preferred. Quinophthalone-based pigment derivatives I (especially the hereinbelow more particularly described pigment derivative Ia) are particularly useful for combination with yellow, orange and red pigments, while phthalocyanine-based pigment derivatives I (particularly the hereinbelow likewise more particularly described pigment derivative Ib) are especially useful for combination with blue, green, violet and black pigments.

Preferably, the sulfonic acid and/or carboxylic acid groups X and Y are directly attached to the pigment core structure P in the pigment derivatives I, i.e., $T^1$ and $B^1$ and also $T^2$ and $B^2$ are all preferably a chemical bond.

However, $T^1$ and $T^2$ may also be bridging moieties of the formula —CONR$^1$— or —SO$_2$NR$^1$— (R$^1$: hydrogen; C$_1$-C$_4$-alkyl; naphthyl or especially phenyl, which may each be substituted by C$_1$-C$_{18}$-alkyl but each preferably unsubstituted). Examples of particularly useful bridging moieties $T^1$ and $T^2$ are —CONH—, SO$_2$NH—, —CON(CH$_3$)— and —SO$_2$N(CH$_3$)—.

Similarly, $B^1$ and $B^2$ may be branched or unbranched C$_1$-C$_8$-alkylene radicals or phenylene radicals. Examples are: methylene, 1,1- and 1,2-ethylene, 1,1-, 1,2- and 1,3-propylene and 1,4-, 1,3- and 1,2-phenylene.

Examples of suitable combinations of the bridging moieties T and B are —CONH—CH$_2$—, —CON(CH$_3$)—CH$_2$—, —CONH—C$_2$H$_4$—, —CONH—CH(CH$_3$)—, —SO$_2$NH—CH$_2$—, —SO$_2$N(CH$_3$)—CH$_2$—, —SO$_2$NH—C$_2$H$_4$—, —SO$_2$NH—CH(CH$_3$)—, —CONH-1, 4-C$_6$H$_4$— and —SO$_2$NH-1, 4-C$_6$H$_4$—.

The sulfonic acid and/or carboxylic acid groups X and Y may each be present as a free acid or as a salt (Ka$^+$: Li$^+$, Na$^+$, K$^+$ or N$^+$R$^2$R$^3$R$^4$R$^5$).

The ammonium salts may be formed of unsubstituted ammonium ions, but preferably at least one of R$^2$, R$^3$, R$^4$ and R$^5$ is other than hydrogen.

Suitable aliphatic radicals R$^2$, R$^3$, R$^4$ and R$^5$ are C$_1$-C$_{30}$-alkyl and C$_3$-C$_{30}$-alkenyl radicals which may each be branched or unbranched and C$_5$-C$_6$-cycloalkyl radicals which may be substituted by C$_1$-C$_{24}$-alkyl and preferably by C$_1$-C$_{18}$-alkyl. Useful aromatic radicals are phenyl and naphthyl which may each be substituted by C$_1$-C$_{24}$-alkyl or by C$_2$-C$_{24}$-alkenyl, especially by C$_1$-C$_{18}$-alkyl or C$_2$-C$_{18}$-alkenyl. The radicals R$^2$, R$^3$, R$^4$ and R$^5$ may also be polyalkyleneoxy radicals of the formula —[CHR$^6$—CHR$^7$—O]$_x$—R$^8$ (R$^6$, R$^7$ and R$^8$: independently hydrogen, C$_1$-C$_6$-alkyl; x$\geq$1). When x is >1, the radicals can be homopolymeric, i.e. for example pure polyethyleneoxy or pure polypropyleneoxy radicals, or copolymeric radicals which comprise various alkyleneoxy units especially as blocks or else randomly, for example polyethyleneoxy-polypropyleneoxy radicals.

Preference is given to aromatic and particular preference to noncyclic aliphatic radicals R$^2$, R$^3$, R$^4$ and R$^5$.

Most particularly suitable ammonium salts are mono-C$_8$-C$_{30}$-alkyl- or -alkenylammonium salts, e.g. lauryl, stearyl, oleyl or tallow alkylammonium salts, and also quaternized ammonium salts which contain from 24 to 42 carbon atoms in total, provided at least one and preferably two of the alkyl and/or alkenyl radicals have at least 8, preferably 12 and more preferably from 12 to 20 carbon atoms, e.g. dimethyldidodecyl-, dimethyldioleyl- and dimethyldistearylammonium salts.

Preferably, the sulfonic acid and/or carboxylic acid groups X and Y are not present in free form in the pigment derivatives I. When they have not already been converted to the salt, the formation of the salt and especially the formation of the sodium salt generally takes place in the course of the production of the pigment preparation, which in this case preferably comprises a neutralizing step. When no or only incomplete salt formation has taken place and a nonionic surface-active additive is used that has a basic site, for example a nitrogen atom, the acid groups may of course also react with this additive to form a salt.

Mixtures of various salts will thus frequently be present. When this is the case, the preferred sodium and/or ammonium salts (especially the ammonium salts explicitly mentioned above) should at least constitute a high fraction of these mixtures.

The pigment derivatives I may comprise from 1 to 4 acid groups. Depending on the pigment core structure P, for example in the case of a phthalocyanine residue P, the pigment derivatives I can constitute random mixtures of molecules having various degrees of substitution so that the mean value of the sum m+n can be a fractional number.

Preferably, the pigment derivatives I comprise sulfonic acid groups only. In this case, a degree of substitution (m+n) in the range from 1 to 3 and especially in the range from 1 to 2 will prove particularly advantageous. When the sulfonic acid groups are present in the form of an ammonium salt (m) and optionally as sodium salt or as a free acid (n), then m is preferably in the range from 1 to 1.8 and n in the range from 0 to 0.2.

Examples of particularly suitable pigment derivatives I are: quinophthalonesulfonic acids of the formula Ia

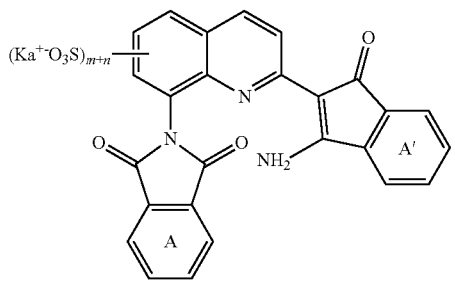

Ia copper phthalocyaninesulfonic acids of the formula Ib

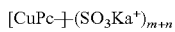

Ib perylenesulfonic acids of the formula Ic

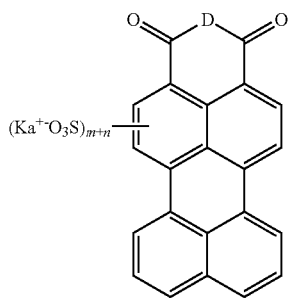

Ic

Here, Ka$^+$ and m+n have the meanings defined at the outset, although Ka is preferably Na$^+$ or N$^+$R$^2$R$^3$R$^4$R$^5$ (especially with the above-recited preferred combinations of the radicals R$^2$ to R$^5$). The sum m+n is in particular 1 in the case of the compounds Ia and Ic, and the sulfonic acid group is preferably in position 6 in the case of the compounds Ia and preferably in position 9 in the case of the compounds Ic.

Rings A and A' in the formula Ia may be the same or different and may each be substituted by from 1 to 4 chlorine and/or fluorine atoms. Preferably, each ring bears 4 chlorine atoms.

D represents —O— or —NR$^9$—, where R$^9$ is hydrogen, C$_1$-C$_4$-alkyl or unsubstituted or C$_1$-C$_4$-alkyl-substituted, C$_1$-C$_4$-alkoxy- and/or phenylazo-substituted phenyl. Preferably, R$^9$ is hydrogen, methyl, 4-ethoxyphenyl, 3,5-dimethylphenyl or 4-phenylazophenyl.

Very particularly preferred pigment derivatives Ia and Ib are those where the symbols each have the preferred meanings, in which connection the pigment derivatives Ia may preferably be present in the form of sodium salts and the pigment derivatives Ib may be present not only as sodium but also as ammonium salts.

Organic core structures for pigments further include azo, diketopyrrolopyrrole, metal complexes, quinacridones, isoindoline and isoindolinones.

The pigment derivatives I are known and are obtainable by following known methods.

The components (B) and (C) differ in their chemical construction. Component (B) is based on ethylene oxide polyethers or ethylene oxide (EO)-propylene oxide (PO) copolymers having terminal ethylene oxide units and component (C) is based on PO polyethers or EO-PO copolymers having terminal propylene oxide units. In addition, component (C) may include water-insoluble EO adducts. Correspondingly, component (B) is notable for its solubility in water, while component (C) is characterized by its water insolubility and/or end group hydrophobicization (compared with EO).

Component (B) thus is water-soluble, while component (C) can be water-soluble or water-insoluble. In general, materials having an HLB value of >10 can be regarded as water-soluble and materials having an HLB value of <10 can be regarded as water-insoluble.

The HLB value is the ratio of the amount of ethylene oxide to the total amount×20. In general, the HLB value is defined by the formula $$HLB = 20\left(1 - \frac{M_L}{M_G}\right),$$

where $M_L$ is the molecular weight of the lipophilic moieties and $M_G$ is the total weight. Further details can be found in H.-D. Dörfer, Grenzflächen and kolloid-disperse Systeme, Springer Verlag 2002, chapter 9.3 "Physical properties and effects of surfactants".

Component (B) comprises at least one nonionic water-soluble surface-active additive selected from the group consisting of ethylene oxide homopolymers; ethylene oxide-propylene oxide block copolymers where the terminal blocks consist of ethylene oxide units; ethylene oxide adducts on mono- or bifunctional amines or alcohols where the length of the ethylene oxide chain is chosen such that the adduct is water-soluble; and ethylene oxide-propylene oxide block copolymer adducts on mono- or bifunctional amines or alcohols where the terminal block consists of ethylene oxide units.

Preferably, the component (B) comprises at least one of the additives which is selected from the group consisting of ethylene oxide-propylene oxide block copolymers where the terminal blocks consist of ethylene oxide units; ethylene oxide adducts on bifunctional amines where the length of the ethylene oxide chain is chosen such that the adduct is water-soluble; ethylene oxide-propylene oxide block copolymer adducts on bifunctional amines where the terminal block consists of ethylene oxide units; ethylene oxide adducts on monofunctional alcohols where the length of the ethylene oxide chain is chosen such that the adduct is water-soluble; and ethylene oxide-propylene oxide block copolymer adducts on monofunctional alcohols where the terminal block consists of ethylene oxide units.

When component (B) comprises an ethylene oxide homopolymer, the latter preferably has a molecular weight in the range from 400 g/mol to 10 000 g/mol.

When component (B) comprises an ethylene oxide (EO)-propylene oxide block (PO) copolymer having terminal blocks of ethylene oxide units, these blocks preferably include the order EO-PO-EO or EO-PO-EO-PO-EO and more preferably EO-PO-EO. The molecular weight of such a copolymer is preferably in the range from 1000 g/mol to 20 000 g/mol. The molar fraction which the ethylene oxide units contribute to the total amount of the copolymer is preferably at least 30 mol % and more preferably in the range from 40 mol % to 60 mol %.

When component (B) comprises an ethylene oxide adduct on mono- or bifunctional amines or alcohols having a length of ethylene oxide chain chosen such that the adduct is water-soluble, this adduct preferably includes a number of ethylene oxide units in the range from 10 units to 100 units. The monofunctional alcohol and monofunctional amine preferably comprises a branched or unbranched alkanol/amine having 10 to 20 carbon atoms, and the alkanol/amine is preferably a primary alcohol or primary amine respectively. A bifunctional alcohol preferably comprises glycol, 1,2-propanediol or 1,3-propanediol. A bifunctional amine preferably comprises ethylenediamine, 1,3-propylenediamine or 1,4-butylenediamine. The molecular weight of the adduct with bifunctional amines or alcohols is preferably in the range from 1000 g/mol to 40 000 g/mol.

When component (B) comprises an ethylene oxide-propylene oxide block copolymer adduct on mono- or bifunctional amines or alcohols having a terminal block of ethylene oxide units, this adduct preferably includes just one propylene oxide and one ethylene oxide block. The number of ethylene oxide units is preferably in the range from 10 to 1000 units and more preferably in the range from 10 to 750 units. The number of propylene oxide units is preferably in the range from 1 to 250 units and more preferably in the range from 10 to 200 units. It is also possible for there to be just small fractions of propylene oxide units, for example 1 to 10 units, preferably 1 to 3 units and, in particular, 1 propylene oxide unit. The monofunctional alcohol and monofunctional amine preferably comprises a branched or unbranched alkanol/amine having 10 to 20 carbon atoms, and the alkanol/amine is preferably a primary alcohol or primary amine respectively. A bifunctional alcohol preferably comprises glycol, 1,2-propanediol or 1,3-propanediol. A bifunctional amine preferably comprises ethylenediamine, 1,3-propylenediamine or 1,4-butylenediamine. The molecular weight of the adduct with bifunctional amines or alcohols is preferably in the range from 1000 g/mol to 40 000 g/mol.

Component (C) comprises at least one surface-active additive selected from the group consisting of propylene oxide homopolymers; ethylene oxide-propylene oxide block copolymers where the terminal blocks consist of propylene oxide units; ethylene oxide adducts on mono- or bifunctional amines or alcohols where the length of the ethylene oxide chain is chosen such that the adduct is water-insoluble; and ethylene oxide-propylene oxide block copolymer adducts on mono- or bifunctional amines or alcohols where the terminal block consists of propylene oxide units.

Preferably, the component (C) comprises at least one of the additives which is selected from the group consisting of ethylene oxide-propylene oxide block copolymers where the terminal blocks consist of propylene oxide units; ethylene oxide-propylene oxide block copolymer adducts on bifunctional amines where the terminal block consists of propylene oxide units.

When component (C) comprises a propylene oxide homopolymer, the latter preferably has a molecular weight in the range from 400 g/mol to 10 000 g/mol.

When component (C) comprises an ethylene oxide-propylene oxide block copolymer having terminal blocks of propylene oxide units, these blocks preferably have the sequence PO-EO-PO or PO-EO-PO-EO-PO and more preferably PO-EO-PO. Preferably, the molecular weight of such a copolymer is in the range from 1000 g/mol to 10 000 g/mol and more preferably in the range from 1000 g/mol to 5000 g/mol. The number of propylene oxide units in the copolymer is preferably in the range from 10 to 100 units and the number of ethylene oxide units is preferably in the range from 1 to 100 units and more preferably in the range from 1 to 75 units.

When component (C) comprises an ethylene oxide adduct on mono- or bifunctional amines or alcohols having a length of ethylene oxide chain chosen such that the adduct is water-insoluble, the number of ethylene oxide units is preferably less than 10. The monofunctional alcohol and monofunctional amine preferably comprises a branched or unbranched alkanol/amine having 10 to 20 carbon atoms, and the alkanol/amine is preferably a primary alcohol or primary amine respectively. A bifunctional alcohol preferably comprises glycol, 1,2-propanediol or 1,3-propanediol. A bifunctional amine preferably comprises ethylenediamine, 1,3-propylenediamine or 1,4-butylenediamine.

When component (C) comprises an ethylene oxide-propylene oxide block copolymer adduct on mono- or bifunctional amines or alcohols having a terminal block of propylene oxide units, this adduct preferably includes just one propylene oxide and one ethylene oxide block. The monofunctional alcohol and monofunctional amine preferably comprises a branched or unbranched alkanol/amine having 10 to 20 carbon atoms, and the alkanol/amine is preferably a primary alcohol or primary amine respectively. A bifunctional alcohol preferably comprises glycol, 1,2-propanediol or 1,3-propanediol. A bifunctional amine preferably comprises ethylenediamine, 1,3-propylenediamine or 1,4-butylenediamine. The molecular weight of the adduct with bifunctional amines or alcohols is preferably in the range from 1000 g/mol to 40 000 g/mol, more preferably in the range from 1000 g/mol to 30 000 g/mol. The number of propylene oxide units in the copolymer is preferably in the range from 10 to 100 units, and the number of ethylene oxide units is preferably in the range from 1 to 100 units and more preferably in the range from 1 to 75 units.

In general, solubility in solvents is achieved by reducing the solubility in water. Water-insoluble additives can thus be dispersed in water in the presence of a water-soluble additive. Water solubility/hydrophobicization is thus controllable for example by hydrophobic propylene oxide blocks being in the terminal or middle position, or by reducing the number of ethylene oxide units in adducts in order that their solubility in water may be reduced.

In detail, the compounds or components (B) and (C) can be constructed as described above, in which case their distinction due to the water solubility or terminal position of PO groups can be achieved by the abovementioned measures for example.

In general, products having fewer than 10, preferably fewer than 8 and more preferably fewer than 6 ethylene oxide units are water-insoluble. Terminal propylene oxide units reduce solubilities in water, and/or constitute more hydrophobic end groups. Water solubilities are discernible from the technical data leaflets of the individual products.

The polyethers comprise EO and/or PO polyalkylene oxides or corresponding reaction products with alcohols and amines. For the purposes of the present invention, the term "alkylene oxide", or EO, PO shall also comprehend aryl-substituted alkylene oxide, especially phenyl-substituted ethylene oxide. Preferably, the term alkylene oxide or EO, PO shall not include any such substituents.

The adducts on mono- or bifunctional alcohols or amines preferably comprise the abovementioned alcohols and amines.

In general, however, the following alcohols or amines can also be used:

Suitable aliphatic alcohols comprise in general from 6 to 26 carbon atoms and preferably from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptylundecanol, 2-octyldecanol, 2-nonyltridecanol, 2-decyltetradecanol, oleyl alcohol and 9-octadecenol and also mixtures of these alcohols, such as $C_8/C_{10}$, $C_{13}/C_{15}$ and $C_{16}/$ $C_{18}$ alcohols, and cyclopentanol and cyclohexanol. Of particular interest are the saturated or unsaturated fatty alcohols obtained from natural raw materials by fat hydrolysis and reduction and the synthetic fatty alcohols from the oxo process. The alkylene oxide adducts with these alcohols typically have average molecular weights $M_n$ from 200 to 5000, in particular from 400 to 2000.

Examples of aromatic alcohols include not only α- and β-naphthol and their $C_1$-$C_4$-alkyl derivatives but also in particular phenol and its $C_1$-$C_{12}$-alkyl derivatives, such as hexylphenol, heptylphenol, octylphenol, nonylphenol, isononylphenol, undecylphenol, dodecylphenol, di- and tributylphenol and dinonylphenol.

Suitable aliphatic amines correspond to the abovementioned aliphatic alcohols. Again of particular importance here are the saturated and unsaturated fatty amines which preferably have from 14 to 20 carbon atoms. Examples of suitable aromatic amines are aniline and its derivatives.

As bifunctional amines there may be used for example amines having two amine groups and conforming in particular to the formula $H_2N$—$(R$—$NR^1)_2$—$H$ ($R$: $C_2$-$C_6$-alkylene; $R^1$: hydrogen or $C_1$-$C_6$-alkyl). Specific examples are: ethylenediamine, diethylenetriamine, triethylenetetramine, tetraethylenepentamine, 1,3-propylenediamine, dipropylenetriamine, 3-amino-1-ethyleneaminopropane, hexamethylenediamine, dihexamethylenetriamine, 1,6-bis (3-aminopropylamino)hexane and N-methyldipropylenetriamine.

As bifunctional alcohols there may be mentioned by way of example $C_2$-$C_6$-alkylene glycols and the corresponding di- and polyalkylene glycols such as ethylene glycol, 1,2-propylene glycol, 1,3-propylene glycol, 1,2-butylene glycol, 1,4-butylene glycol, 1,6-hexylene glycol, dipropylene glycol and polyethylene glycol.

The alkylene oxide block copolymers are known and are commercially available for example under the names of Tetronic® (water-soluble and water-insoluble), Pluronic® (water-soluble and water-insoluble) (BASF) and Synperonic® (Uniqema).

The pigment preparations of the present invention comprise at least 60% by weight, preferably 60% to 90% by weight and more preferably 70% to 85% by weight of component (A), 1% to 39% by weight and preferably 5% to 30% by weight of component (B) and 1% to 39% by weight, preferably 1% to 25% by weight, and especially 1% to 20% by weight of component (C), all based on the total weight of the preparation.

The preparation of the present invention may further comprise further constituents (D). These comprise a fraction ranging from 0% by weight to 10% by weight based on the total weight of the preparation. These are thus present or not present, and if present their proportion is preferably in the range from 0.1% by weight to 10% by weight, more preferably in the range from 0.5% by weight to 7.5% by weight and even more preferably in the range from 1% by weight to 5% by weight.

Antioxidants may be concerned here for example.

Examples of suitable antioxidants are the known classes of sterically hindered phenols, aromatic amines, thiosynergists, phosphites and phosphonites and sterically hindered amines.

Antioxidants based on sterically hindered phenols comprise as essential building block a phenol substituted by at least one tert-butyl group in the ortho position, in particular by tert-butyl groups in both ortho positions, relative to the OH group. Most known products comprise two or more of these building blocks, which are bonded together via various bridging members.

Antioxidants based on aromatic amines comprise in the main diarylamines, amine-ketone condensation products, for example aniline-acetone condensates and substituted p-phenylenediamines.

Examples of thiosynergists are the metal salts of dialkyldithiocarbamic acids, zinc dialkyldithiophosphates and esters (particularly dilauryl, dimyristyl and distearyl esters) of thiodipropionic acid.

Antioxidants based on phosphites and phosphonites typically comprise esters of the corresponding acids of phosphorus with alkyl-substituted, more particularly tert-butyl-substituted, phenols.

Antioxidants based on sterically hindered amines (HALS) comprise as essential building block a 2,6-dialkyl-substituted, more particularly a -dimethyl-substituted, piperidine which is linked in the 4-position via a wide variety of bridging members to further piperidine building blocks.

Antioxidants are common knowledge and obtainable for example under the names of Irganox®, Irgaphos®, Chimassorb® and Irgastab® (Ciba), Topanol® (ICI), Hostanox® (Clariant) and Goodrite® (Goodyear).

When the preparation of the present invention comprises an antioxidant, the antioxidant content is generally in the range from 0.1% to 5% by weight and particularly in the range from 0.1% to 2% by weight based on the total weight of the preparation.

The preparation may further comprise small amounts of defoamers (0.01% to 0.2% by weight based on the total weight of the preparation for example from Tego, Byk, Borchers) and biocides (0.01% to 0.5% by weight based on the total weight of the preparation for example from Thor, Rohm & Haas). The preparation may further comprise thickeners (preferably 0.01% by weight to 2% by weight, if present, based on the total weight of the preparation, for example from Coatex, BASF, Tego, Aqualon).

As further constituent of component (D) there may be mentioned for example anionic dispersants as described for example in WO-A 04/046251 or polyurethane-based dispersants as described in WO-A 06/084861.

The preparation of the present invention is advantageously obtainable by the production process which is likewise in accordance with the present invention, by wet-comminuting the component (A) in an aqueous suspension comprising some or all of the additive (B) and optionally (D) either in the presence of the additive (C) or subsequently adding the additive (C) and optionally (D) and then drying the suspension, if appropriate after addition of the remaining amount of additive (B) and optionally (D).

Component (A) can be used in the process of the present invention as a dry powder or in the form of a presscake.

Preferably, component (A) is used in the form of a conditioned product, i.e., the primary particle size of the pigment has already been adjusted to the value desired for the application. Pigment conditioning is particularly advisable in the case of organic pigments, since the as-synthesized crude product of a pigment synthesis is generally not directly suitable for use. In the case of inorganic pigments, for example oxide and bismuth vanadate pigments, adjustment of the primary particle size can also take place in the course of pigment synthesis, so that the as-synthesized pigment suspensions can be used directly in the process of the present invention.

Since the conditioned pigment (A) typically reagglomerates in the course of drying or on the filter assembly, it is subjected to wet comminution, for example grinding in a stirred media mill, in aqueous suspension.

The wet comminution should be carried out in the presence of some or all of the additive (B) which is present in the final pigment preparation, and it is preferable to add the entire amount of additive (B) before the wet-comminuting operation.

Additive (C) can be added before, during or after the wet-comminuting operation.

The additive (D) can be added together with (B) or (C).

Depending on the method of drying chosen—spray granulation and fluidized bed drying, spray drying, drying in a paddle dryer, evaporating and subsequent comminution—the particle size of the pigment preparations of the present invention can be controlled to a specifically targeted value.

Spray and fluidized bed granulation may yield coarsely divided granules having average particle sizes from 50 to 5000 μm, and particularly from 100 to 1000 μm. Spray drying typically yields granules having average particle sizes <20 μm. Finely divided preparations are obtainable by drying in a paddle dryer and by evaporation with subsequent grinding. Preferably, however, the pigment preparations of the present invention are in granule form.

Spray granulation is preferably carried out in a spray tower using a one-material nozzle. The suspension is spray dispensed in the form of relatively large drops, and the water evaporates. The additives (B) and (C) melt at the drying temperatures and so lead to the formation of a substantially spherical granule having a particularly smooth surface (BET values generally ≤15 m$^2$/g and particularly ≤10 m$^2$/g.

A preferred process of spray granulation comprises the following steps:
(a) atomizing the suspension preferably comprising
  (A0) 30% to 90% by weight of a solvent component based on the total weight of the suspension;
  (A1) 2% to 60% by weight of a pigment component based on the total weight of the suspension;
  (A2) 0% to 50% by weight of a first filler component based on the total weight of the suspension,
  (A3) 10% to 70% by weight of a surface-active additive component based on the sum total of the weights of components (A1) and (A2), and optionally further components,
  the sum total of the weight fractions of all components based on or converted to the total weight giving 100% by weight,
  in an atomizing device;
(b) contacting the droplets formed in step (a) with a gas stream having a predetermined temperature to dry the droplets to obtain a granular product having a predetermined residual moisture content, and
(c) separating the granules from the gas stream,
wherein in step (b), before the residual moisture content is reached, the droplets are exposed, at least partially/partly, to an aerosol comprising a solid second filler component.

Preferably, the preparation of the present invention comprises granules having an average particle size in the range from 50 to 5000 μm and a BET surface area of ≤15 m$^2$/g.

The gas inlet temperature in the spray tower is generally in the range from 180 to 300° C. and preferably in the range from 150 to 300° C. The gas outlet temperature is generally in the range from 70 to 150° C. and preferably in the range from 70 to 130° C.

The residual moisture content of the granular pigment obtained is generally <2% by weight.

The pigment preparations of the present invention are notable in use for their excellent color properties which are comparable to those of liquid pigment formulations, especially with regard to color strength, brilliance, hue and hiding power, and in particular for their stir-in characteristics, ie they can be dispersed in application media with a minimal input of energy, simply by stirring or shaking. This applies in particular to the coarsely divided pigment granules, which constitute the preferred embodiment of the pigment preparations of the present invention.

Compared with liquid pigment formulations, the pigment preparations of the present invention additionally have the following advantages: They have a higher pigment content. Whereas liquid formulations tend to change viscosity during storage and have to be admixed with preservatives and agents for enhancing the resistance to freezing and/or drying out (crusting), the pigment preparations of the present invention exhibit very good stability in storage. They are both economically and ecologically advantageous with regard to packaging, storage and transportation. Since they are solvent free, they are more flexible in use.

The pigment preparations of the present invention which are in granule form are notable for excellent attrition resistance, a minimal tendency to compact or clump, uniform particle size distribution, good pourability, flowability and meterability and also dustlessness in handling and application.

The pigment preparations of the present invention are very useful for pigmenting macromolecular organic and inorganic materials of any kind. Liquid application media in this context can also be purely aqueous; comprise mixtures of water and organic solvents, for example alcohols; or be based exclusively on organic solvents, such as alcohols, glycol ethers, ketones, eg methyl ethyl ketone, amides, eg N-methylpyrrolidone and dimethylformamide, esters, eg ethyl acetate, butyl acetate and methoxypropyl acetate, or aromatic or aliphatic hydrocarbons, eg xylene, mineral oil and mineral spirits.

Examples of materials which can be pigmented with the pigment preparations of the present invention include: coatings, for example architectural coatings, industrial coatings, automotive coatings, radiation-curable coatings; paints, including paints for building exteriors and building interiors, for example wood paints, lime washes, distempers, emulsion paints; printing inks, for example offset printing inks, flexographic printing inks, toluene gravure printing inks, textile printing inks, radiation-curable printing inks; liquid inks, including inkjet inks; color filters; building materials (water is typically added only after building material and pigment preparation have been dry mixed), for example silicate render systems, cement, concrete, mortar, gypsum; bitumen, caulks; cellulosic materials, for example paper, paperboard, cardboard, wood and woodbase, which can each be coated or otherwise finished; adhesives; film-forming polymeric protective colloids as used for example in the pharmaceutical industry; cosmetic articles; detergents.

The pigment preparations of the present invention are particularly useful as mixing components in color-mixing or -matching systems. Owing to their stir-in characteristics, they can be used directly as a solid for this purpose. If desired, however, they can also be first converted into base colors, mixing varnishes and tinting colors (especially into colors having a high solids content, "HS colors"), or even more highly pigmented tinting pastes which then constitute the components of the mixing system. The matching of the desired hue and hence the mixing of the color components can be effected visually via a system of color cards in a very large number of hue gradations which are based on color standards, such as RAL, BS and NCS, or preferably under computer control, whereby an unlimited number of hues become accessible ("computer color matching").

EXAMPLES

Example 1

A solid pigment preparation which is in accordance with the present invention was produced by following conventional processes, and comprises the following constituents, each based on the total weight of the preparation:

| Material | Weight fraction in % | | | | | | | | | Component |
|---|---|---|---|---|---|---|---|---|---|---|
| | B1 | B2 | B3 | B4 | B5 | B6 | B7 | B8 | B9 | |
| carbon black | 37 | | | | | | | | | A |
| talcum filler | 35 | 36 | 36 | 36 | 36 | 0 | | 36 | | A |
| Heliogen Blue 7080, P.B. 15:3 | | | 37 | 37 | 37 | 75 | | | 37 | A |
| Sico Fast Yellow FR1252, P.Y. 74 | | 37 | | | | | 75 | 80 | | A |
| C$_{16}$-alkylpolyethylene glycol monoether (80 EO) | 20 | 20 | 20 | 12.5 | 5 | 12.5 | 12.5 | 10 | | B |
| block-copolymeric ethylenediamine-PO-EO with 40 wt % EO | | | | | | | | | 12.5 | B |
| inverse ethylene oxide-propylene oxide copolymer | 5 | 5 | 5 | 12.5 | 20 | 12.5 | 12.5 | 9 | 12.5 | C |
| dispersant | 2 | 2 | 2 | 2 | 2 | | | 1 | 2 | D |
| antioxidant | 1 | | | | | | | 1 | | D |

Alkyd-melamine baking finish (35% by weight solids content, xylene as solvent), white reduction with white pigment content of 20.0% by weight (TiO$_2$, Kronos 2059) (EPL test binder, BASF)

| | Baking finish |
|---|---|
| B1 | free of bits |
| B2 | free of bits |
| Comparative example P.B. 15:3*) | not dispersible |
| B3 | free of bits |
| B4 | free of bits |
| B5 | free of bits |
| B6 | free of bits |
| B7 | free of bits |
| Comparative example P.Y. 74*) | not dispersible |
| B8 | free of bits |

*)Comparative examples used: WO-A 03/064540 Ex. 2 (P.Y. 74), Ex. 11 (P.B. 15:3), WO-A 03/066743 Ex. 2 (P.Y. 74), Ex. 11 (P.B. 15:3)

We claim:

1. A solid pigment preparation, comprising, based on a total weight of the preparation:
   (A) at least 60% by weight of a pigment component comprising one or more pigments and optionally a filler;
   (B) 1% by weight to 39% by weight of at least one nonionic water-soluble surface-active additive having an HLB value of greater than 10 and comprising at least one polyether selected from the group consisting of an ethylene oxide homopolymer, an ethylene oxide-propylene oxide block copolymer with terminal blocks consisting of ethylene oxide units, an ethylene oxide adduct on at least one mono- or bifunctional amine or alcohol with a length of ethylene oxide chain being such that the adduct is water soluble, and an ethylene oxide-propylene oxide block copolymer adduct on at least one mono- or bifunctional amine or alcohol with at least one terminal block consisting of ethylene oxide units;
   (C) 1% by weight to 39% by weight of at least one nonionic surface-active additive having an HLB value of less than 10 and comprising at least one polyether selected from the group consisting of an ethylene oxide-propylene oxide block copolymer with terminal blocks consisting of propylene oxide units, and an ethylene oxide-propylene oxide block copolymer adduct on at least one bifunctional amine with a terminal block consisting of propylene oxide units; and
   (D) 0% by weight to 10% by weight of an additive component comprising at least one further additive other than additives of components (A) and (B),
   wherein a sum total of weight fractions does not exceed 100% by weight.

2. The preparation of claim 1, wherein component (A) comprises at least one filler.

3. The preparation of claim 1, wherein the sum total of the weight fractions of components (B) and (C) based on the total weight of the preparation is in a range from 10% by weight to 30% by weight.

4. The preparation of claim 1, wherein the component (B) comprises at least one of the additives which is selected from the group consisting of an ethylene oxide-propylene oxide block copolymer with terminal blocks consisting of ethylene oxide units, an ethylene oxide adduct on at least one bifunctional amine with a length of ethylene oxide chain such that the adduct is water-soluble, an ethylene oxide-propylene oxide block copolymer adduct on at least one bifunctional amine with a terminal block consisting of ethylene oxide units, an ethylene oxide adduct on at least one monofunctional alcohol with a length of ethylene oxide chain such that the adduct is water-soluble, and an ethylene oxide-propylene oxide block copolymer adduct on a monofunctional alcohol with a terminal block consisting of ethylene oxide units.

5. The preparation of claim 1, comprising granules having an average particle size in a range from 50 to 5000 µm and a BET surface area of 15 m$^2$/g or less.

6. A process for producing the preparation of claim 1, comprising:
   wet-comminuting the component (A) in an aqueous suspension comprising some or all of the additive (B) and, optionally, (D) either in the presence of the additive (C) or subsequently adding the additive (C) and, optionally, (D); and then drying the suspension, optionally after addition of a remaining amount of additive (B) and, optionally, (D).

7. A process for coloring macromolecular at least one of an organic and an inorganic material, comprising:

incorporating the preparation of claim 1 into the at least one material by stirring or shaking.

8. The process of claim 7, wherein the at least one material is a varnish, a paint, a printing ink, a liquid ink, a coating system comprising water, a coating system comprising at least one organic solvent or a coating system comprising a mixture of water and at least one organic solvent as liquid phase.

9. A process for coloring macromolecular at least one of an organic and an inorganic material with at least one color-mixing system, comprising:

mixing a composition comprising the preparation of claim 1.

10. The preparation of claim 2, wherein the sum total of the weight fractions of components (B) and (C) based on the total weight of the preparation is in a range from 10% by weight to 30% by weight.

11. The preparation of claim 2, wherein the component (B) comprises at least one of the additives which is selected from the group consisting of an ethylene oxide-propylene oxide block copolymer with terminal blocks consisting of ethylene oxide units, an ethylene oxide adduct on at least one bifunctional amine with a length of ethylene oxide chain such that the adduct is water-soluble, an ethylene oxide-propylene oxide block copolymer adduct on at least one bifunctional amine with a terminal block consisting of ethylene oxide units, an ethylene oxide adduct on at least one monofunctional alcohol with a length of ethylene oxide chain such that the adduct is water-soluble, and an ethylene oxide-propylene oxide block copolymer adduct on a monofunctional alcohol with a terminal block consisting of ethylene oxide units.

12. The preparation of claim 3, wherein the component (B) comprises at least one of the additives which is selected from the group consisting of an ethylene oxide-propylene oxide block copolymer with terminal blocks consisting of ethylene oxide units, an ethylene oxide adduct on at least one bifunctional amine with a length of ethylene oxide chain such that the adduct is water-soluble, an ethylene oxide-propylene oxide block copolymer adduct on at least one bifunctional amine with a terminal block consisting of ethylene oxide units, an ethylene oxide adduct on at least one monofunctional alcohol with a length of ethylene oxide chain such that the adduct is water-soluble, and an ethylene oxide-propylene oxide block copolymer adduct on a monofunctional alcohol with a terminal block consisting of ethylene oxide units.

* * * * *